United States Patent [19]

Azim et al.

[11] Patent Number: 5,398,891
[45] Date of Patent: Mar. 21, 1995

[54] REMOTE PARACHUTE ACTIVATION DEVICE

[76] Inventors: Nik M. Azim, 3747 Lowell Rd., Cleveland Heights, Ohio 44121; Douglas E. Bahniuk, 3109 Mayfield Rd., Ste. #203, Cleveland Heights, Ohio 44118

[21] Appl. No.: 59,249

[22] Filed: May 10, 1993

[51] Int. Cl.⁶ .................. B64D 17/54; B64D 17/62
[52] U.S. Cl. .................. 244/149; 244/152
[58] Field of Search ............ 244/149, 150, 152, 137.3, 244/137.4, 147; 340/825.69

[56] References Cited

U.S. PATENT DOCUMENTS

| | | |
|---|---|---|
| 2,555,341 | 6/1951 | Johnson . |
| 2,570,295 | 10/1951 | Vantine, Jr. . |
| 3,293,549 | 12/1966 | Patterson .................. 340/825.69 |
| 3,433,441 | 3/1969 | Cummings . |
| 3,571,697 | 3/1971 | Phillips . |
| 3,626,309 | 12/1971 | Knowles . |
| 3,667,705 | 6/1972 | Snyder . |
| 3,745,877 | 7/1973 | Dobson et al. . |
| 3,984,983 | 10/1976 | Chevrier et al. . |
| 3,992,999 | 11/1976 | Chevrier et al. . |
| 4,241,870 | 12/1980 | Marcus .................. 340/825.69 |
| 4,661,996 | 4/1987 | Scandurra . |
| 4,834,317 | 5/1989 | Deppner . |
| 4,858,856 | 8/1989 | Cloth . |
| 4,865,273 | 9/1989 | Jones . |

FOREIGN PATENT DOCUMENTS 2554227  6/1977  Germany .................. 244/149

*Primary Examiner*—Andres Kashnikow
*Assistant Examiner*—Virna Lissi Mojica

[57] ABSTRACT

An apparatus for the opening of skydiver's parachute by another skydiver, instantaneously and without physical contact between them, is provided. The device provides a skydiver with the means of generating radio frequency signals, and provides a second skydiver with the means to process those signals and trigger a parachute opening mechanism that opens the parachute of the second skydiver. This invention provides the ability for a more experienced skydiver such as an instructor, to open the parachute of a lesser experienced skydiver, such as a student. In addition, this device can also be used in the activation of a parachute opening mechanism that it attached to any entity accompanying a skydiver in freefall.

18 Claims, 5 Drawing Sheets

REMOTE PARACHUTE ACTIVATION DEVICE

BACKGROUND OF THE INVENTION

1. Field of the Invention

This invention relates in general to control systems for opening aerodynamic decelerators such as parachutes and the like, and in particular to aerodynamic decelerator opening control systems that are operated by remote command.

2. Description of Related Art

Skydiving is a sport that requires extensive training to master. One type of training involves a series of free falls that a student, accompanied by instructors, must execute in a manner that satisfies established guidelines. In these free falls, the student is required to open his parachute by pulling his ripcord on his own initiative, or at his instructors' signal. If he fails to react accordingly within a brief time period, an instructor then reaches out to the student's ripcord and pulls it for him.

This procedure is risky and dangerous as many events can go wrong. One of the events that can go wrong occurs if a student falls away from the instructors as he jumps out of the airplane. If the student continues to drift away, the instructors may not be able to catch up to the student in time to deploy his parachute if the student does not. Another problem situation arises if a student panics and moves his arms and legs thereby preventing the instructor from reaching the student's ripcord. The time period between leaving the aircraft and reaching the lowest altitude where the parachute must be opened in order to function correctly is approximately one minute, which makes even minor complications extremely hazardous.

Heretofore, most safety devices that incorporate a control system for automatically opening parachutes consist of mechanisms that use elevation and velocity as determining parameters. These devices automatically activate a parachute opening mechanism at preset elevation and velocity conditions. One such device is disclosed in U.S. Pat. No. 3,667,705 to S. L. Snyder. That patent discloses a device that triggers a parachute opening mechanism at a preset elevation relative to the ground level if the parachutist is falling at a velocity greater than a predetermined value. The elevation and velocity values are chosen to trigger the parachute opening mechanism if the parachutist fails to open the parachute himself before descending to a certain altitude.

U.S. Pat. Nos. 3,984,984 and 3,992,999 to F. X. Chevrier et al. disclose devices that pull the ripcord of a skydiver's parachute at a predetermined altitude after they are activated, directly or indirectly, by the skydiver.

U.S. Pat. Nos. 4,858,856 to H. Cloth, and 4,865,273 to L. Jones disclose devices whose functions are similar to that of the patent to S. L. Snyder. Although these devices execute those functions in a different manner, they suffer from the same limitations as that patent.

The problem with devices similar to the ones disclosed in the aforementioned U.S. Patents is that they do not allow an instructor, in a training situation, to open the parachute of a student at the moment he deems it best. These devices are fully automatic and changes cannot be made to their triggering function while they are in flight. If one of these devices is preset to open a parachute at the lowest elevation required for a safe landing, it will not allow a skydiver much time to prepare for landing. A panic stricken skydiver will require addition time to calm down prior to the landing. If, however, the elevation is preset to a level much higher than that required for a safe landing, the device will allow the student fewer opportunities to correct mistakes on his own. The parachute may also open prematurely, endangering the student or the instructors. Furthermore, these devices depend on changes in air pressure to trigger them. If a skydiver is falling in a manner that minimizes the difference in the measured air pressure, such as on his back, the accuracy of these devices may be affected.

It is desirable to provide a device that allows a skydive instructor to open a student's parachute instantaneously and without the need to be in physical contact. No device is known, however, that achieves this function.

SUMMARY OF THE INVENTION

The principle object of the present invention is to provide a device to be used in training skydive students whereby skydive instructors, accompanying the students in freefall, are provided with the means to open the students' parachutes.

It is also an object of the present invention to provide such a device whereby an instructor has the ability to open a student's parachute without the need for physical contact between them.

Another object is to provide such a device whereby an instructor has the ability to open a student's parachute instantaneously.

These objects, as well as other objects which will become apparent from the discussion that follows, are achieved by the present invention.

The present invention includes a transmitter that is used to actuate a matching receiver which then activates a processing circuit which in turn triggers an already existing parachute opening mechanism similar to that which is used in conjunction with elevation and velocity dependent parachute activation devices. The present invention can be divided into two parts: the Instructor Module and the Student Module.

The Instructor Module consists of a battery powered transmitter, and is attached to the harness of a skydive instructor. The instructor can instantaneously cause the opening of a student's parachute by activating the transmitter, which sends out airborne signals that can be recognized by a matching receiver.

The Student Module consists of a battery powered matching receiver and processing circuit, and is attached to the harness of a skydive student. When the airborne signals sent by the transmitter actuates the matching receiver, the matching receiver activates the processing circuit which in turn triggers a parachute opening mechanism, which is attached to the student's harness.

It will, therefore, be appreciated that by virtue of the present invention, the opening of a student's parachute by an instructor, instantaneously and without physical contact, is possible.

Related objects and advantages of the present invention will be apparent from the following description.

DETAILED DESCRIPTION OF THE PREFERRED EMBODIMENTS

Figure 1A:
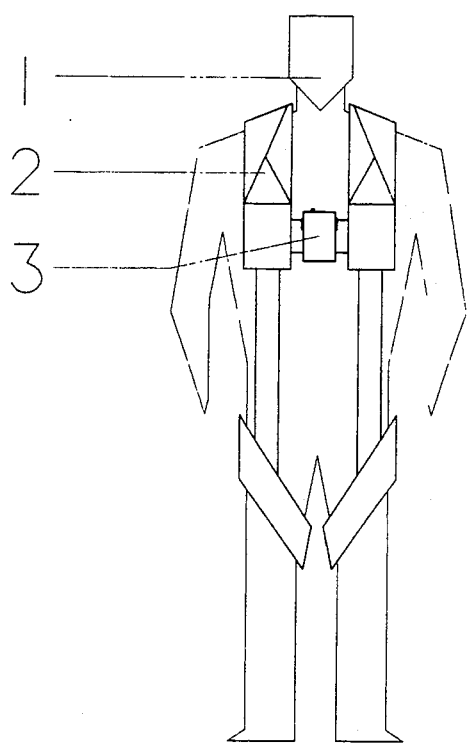
FIGS. 1A and 1B are frontal views of an instructor and a student, respectively, suited in harnesses which are fired with modules constructed in accordance with one embodiment of the invention.

For the purposes of promoting an understanding of the principles of the invention, reference will now be made to the embodiment illustrated in the drawings and specific language will be used to describe the same. It will nevertheless be understood that no limitation of the scope of the invention is thereby intended.

This invention, consisting of an Instructor Module and a Student Module, relates to control systems for activating aerodynamic decelerators, such as parachutes and the like by triggering an aerodynamic decelerator opening mechanism, such as a parachute opening mechanism and the like.

Figure 1B:
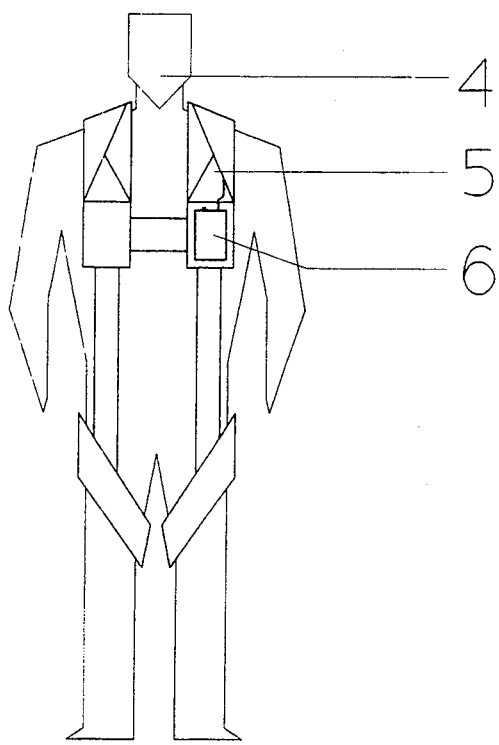

Referring to FIG. 1A there is illustrated an instructor 1, suited in a standard harness 2, fitted with one embodiment of the Instructor Module of the present invention 3. FIG. 1B shows a student 4, suited in a standard harness 5, fitted with one embodiment of the Student Module of the present invention 6. The modules are secured in place with a hook and loop fastener such as those made by Velcro USA Inc. (Manchester, N.H.), or the like.

Figures 2A, 2B:
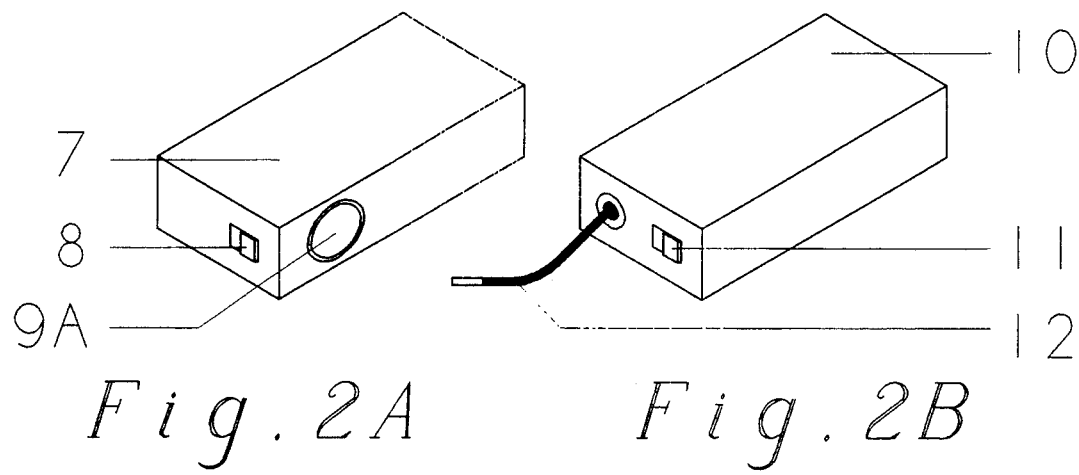
FIGS. 2A and 2B are perspective views of the modules shown in FIGS. 1A and 1B, respectively.
Figures 2C, 2D:
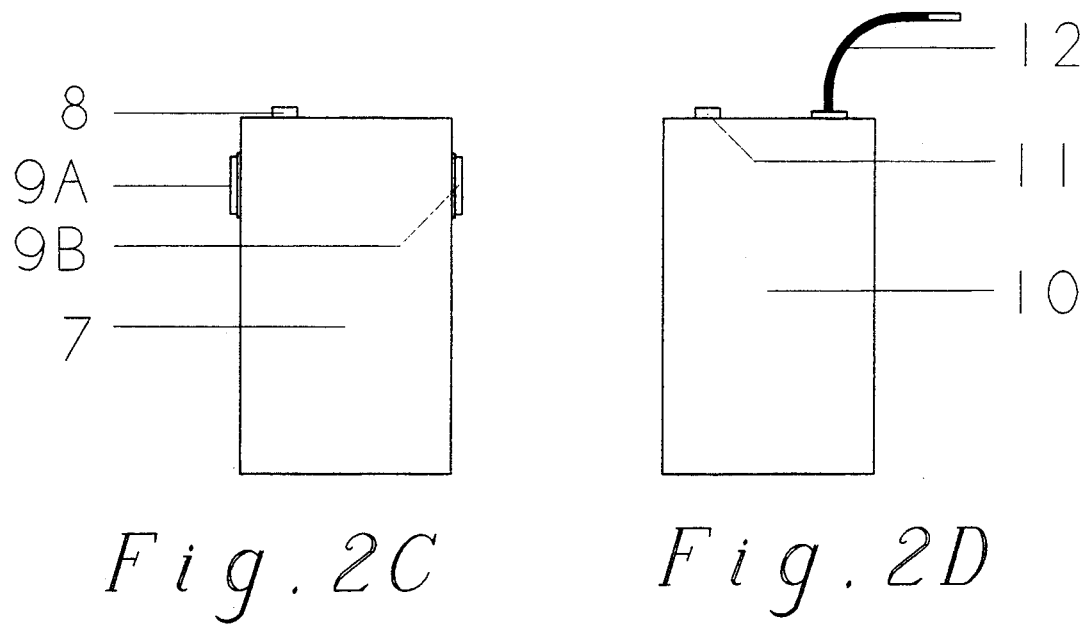
FIGS. 2C and 2D are frontal views of the modules shown in FIGS. 1A and 1B, respectively.

FIGS. 2A and 2C shows the Instructor Module assembly of one embodiment of the present invention. The assembly consists of a housing unit 7, a power switch 8, and two activation switches 9A and 9B.

FIGS. 2B and 2D shows the Student Module assembly of one embodiment of the present invention. The assembly consists of a housing unit 10, a power switch 11, and an output cable with interface 12.

Figure 3:
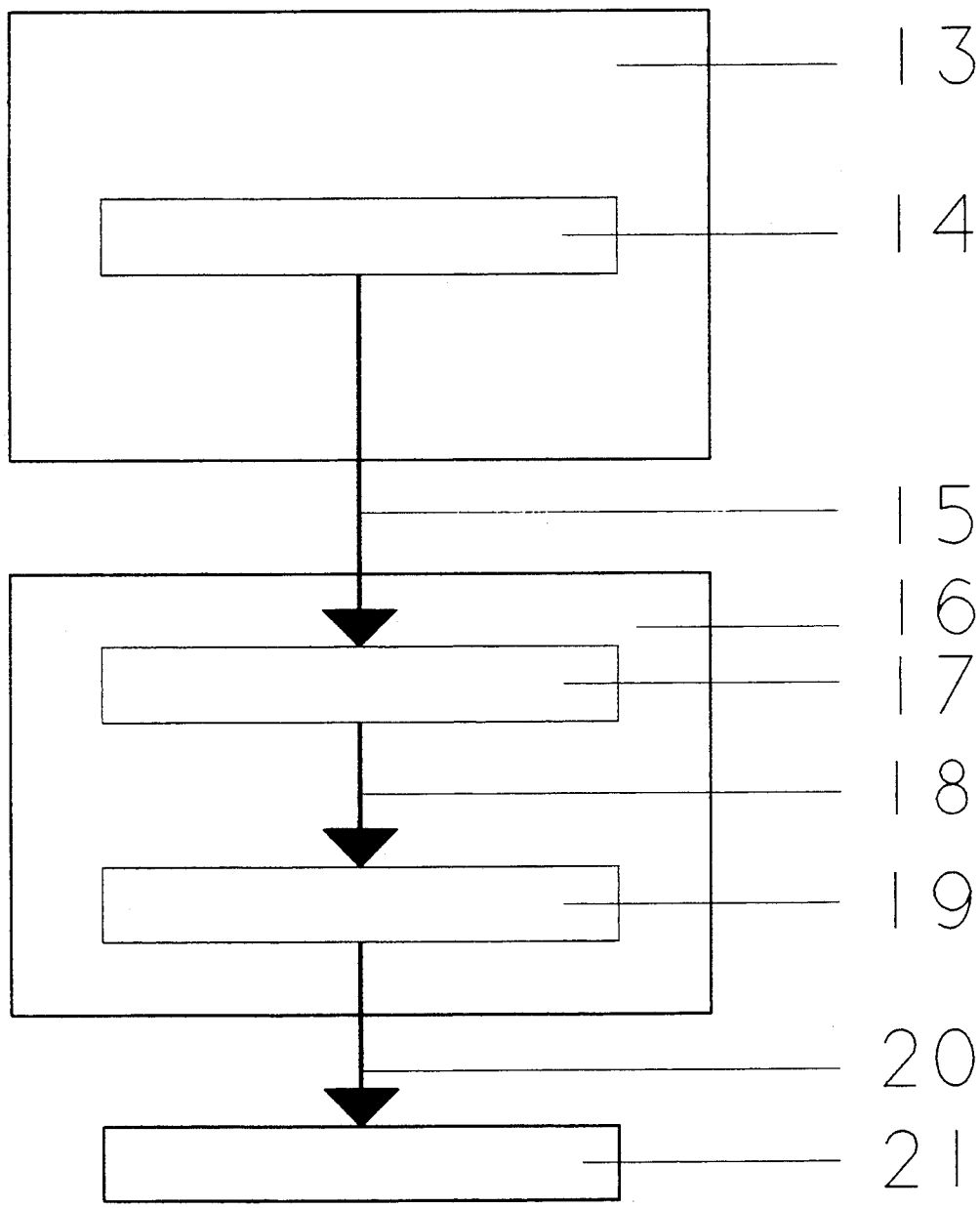
FIG. 3 is a block diagram associated with the invention.

FIG. 3 shows a block diagram associated with one embodiment of the invention. The Instructor Module 13 consists of an electronic transmitter 14, which when activated produces airborne signals 15. These signals 15 are transmitted to the Student Module 16, which consists of an electronic receiver 17 and electronic processing circuit 19. After the receiver 17 receives and verifies the airborne signals 15, it produces an output signal 18 which activates the processing circuit 19 which directs a current flow 20 that triggers an aerodynamic decelerator opening mechanism 21.

Figure 4A:
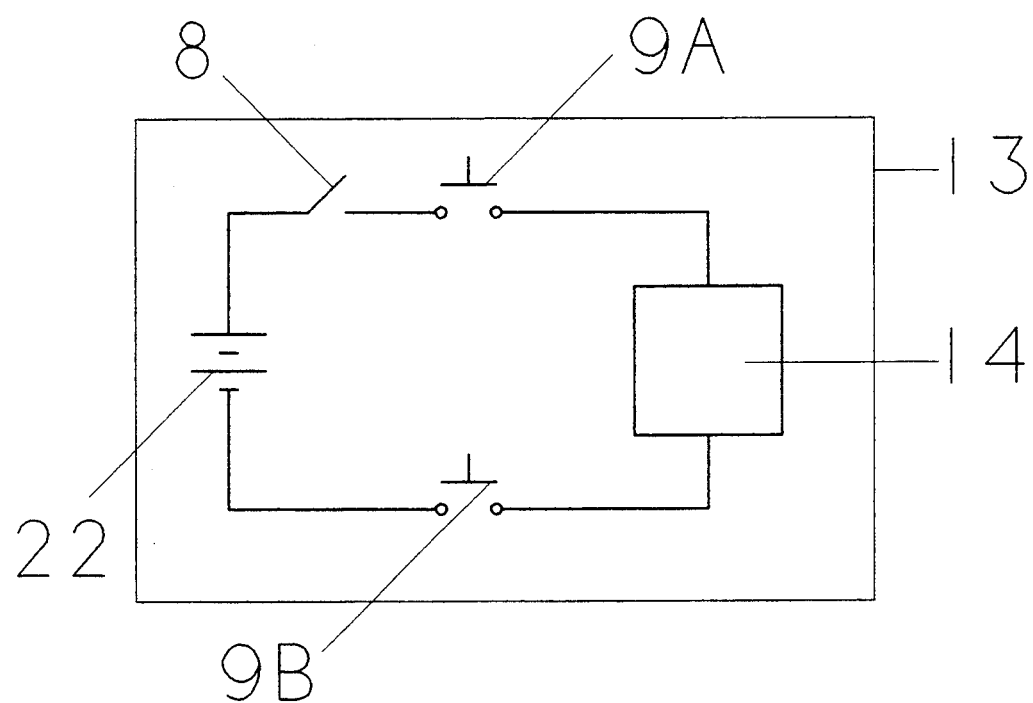
FIG. 4A and 4B are schematic diagrams associated with the invention.
Figure 4B:
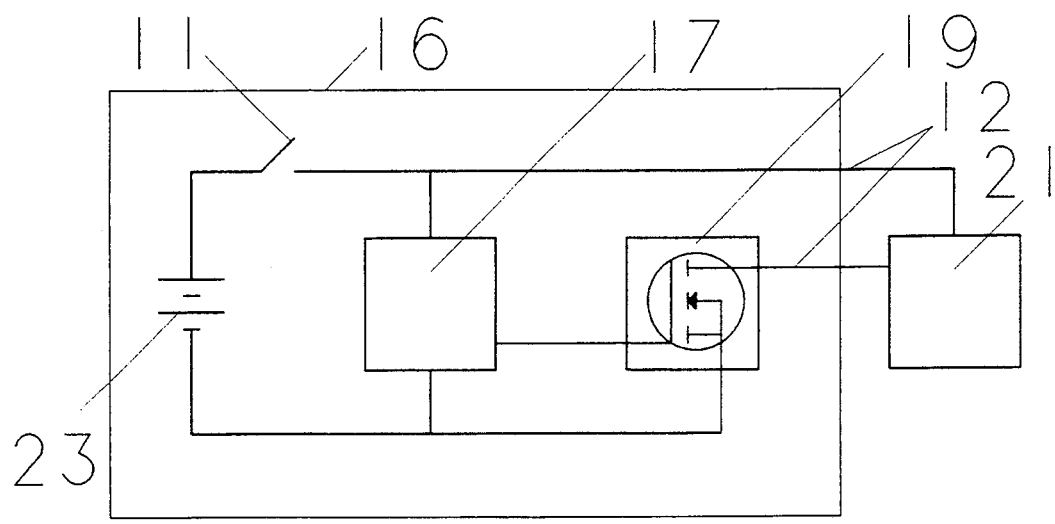

FIGS. 4A and 4B show the schematic diagram associated with one embodiment of the Instructor Module and the Student Module, respectively. FIGS. 4A and 4B are representations of the block diagram of FIG. 3 in schematic form.

Referring to FIG. 4A, the Instructor Module 13 consists primarily of an electronic radio frequency (RF) transmitter 14 that is connected to a battery power source 22 by a power switch 8 and two activation switches 9A and 9B. The RF transmitter is a conventional item such as the TX-99 RF transmitter from Electronics 123 (City of Industry, Calif.), and the like.

The Instructor Module, when activated, transmits airborne RF signals that actuate a matching receiver in the Student Module. The Instructor Module is placed in standby mode by turning on power switch 8. Once in the standby mode, the instructor can activate the RF transmitter 14 within his module by pressing the two activation switches 9A and 9B. The embodiment of the present invention illustrated in FIGS. 2A, 2C and 4A require both switches to be pressed simultaneously in order to prevent false activation of the transmitter.

Referring to FIG. 4B, the Student Module 16 consists primarily of an electronic RF receiver 17 and an electronic processing circuit 19. The RF receiver 17 and the processing circuit 19 are connected to each other, and to a battery power source 23 by a power switch 11. The RF receiver is a conventional item such as the RE-99 RF receiver from Electronics 123 (City of Industry, Calif.), and the like. The processing circuit consists of a controllable electron valve, such as a transistor and the like.

The Student Module receives and verifies airborne RF signals and triggers a parachute opening mechanism when the RF signals from the transmitter are received. The Student Module is placed in standby mode by turning on power switch 11. Once in the standby mode, the RF receiver will produce a Valid Transmission (VT) output signal 18 when it receives the RF signals from the Instructor Module. This output signal activates the processing circuit which directs current 20 through an output cable 12 to the parachute opening mechanism 21 thereby triggering it. The embodiment of the present invention illustrated in FIGS. 2B and 2D provides an output cable 12 to link the Student Module with the parachute opening mechanism.

The aerodynamic decelerator opening mechanism 21 is a conventional item such as the Micro-Puller from SSE Inc. (Pennsauken, N.J.). It is already in use in conjunction with altitude and velocity dependent automatic parachute activation devices.

Thus, it is clear that the Remote Parachute Activation Device of the invention provides a means for a person, such as a skydive instructor, to open the parachute of another person, such as a student, instantaneously and without being in physical contact through the use of airborne signals. Furthermore, this invention can also be used by a skydiver to open the parachute of any entity accompanying him in freefall, including tandem skydivers, equipment and the like.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. Accordingly, the scope of the invention should not be determined by the embodiment illustrated, but by the appended claims and their legal equivalents.

I claim:

1. A control system for activating aerodynamic decelerators including:
   a) an electronic transmitter of airborne signals, comprising protection means for preventing false activation of said transmitter and, comprising containment means for housing elements including said transmitter;
   b) an electronic receiver of airborne signals, comprising triggering means for activating said aerodynamics decelerators by the airborne signals from said transmitter c) wherein said means for transmitting airborne signals and said means for receiving airborne signals, are activated when said means for transmitting and said means for receiving are in a freefall flight condition.

2. The device of claim 1 wherein said triggering means comprises a transistor.

3. The device of claim 1 wherein said triggering means comprises an aerodynamic decelerator opening mechanism.

4. The device of claim 1 wherein said triggering means comprises a parachute opening mechanism.

5. The device of claim 1 wherein said triggering means comprises a controllable electron valve.

6. A method for activating aerodynamic decelerators comprising, in combination:
   a) a means for transmitting airborne signals, comprising protection means for preventing false activation of said transmitting means and, comprising containment means for housing elements including said transmitting means;
   b) a means for receiving airborne signals comprising triggering means for activating said aerodynamic decelerators using said airborne signals
   c) wherein said means for transmitting airborne signals and said means for receiving airborne signals, are activated when said means for transmitting and said means for receiving are in a freefall flight condition.

7. The device of claim 6 wherein said protection means comprises two switches.

8. The device of claim 6 wherein said containment means comprises a housing unit, whereby the said housing unit is substantially sized to allow said housing unit to be secured to a harness.

9. The device of claim 6 wherein said aerodynamic decelerators comprises parachutes.

10. The device of claim 6 wherein said airborne signals comprises radio frequency signals.

11. The device of claim 6 wherein said triggering means comprises a transistor.

12. The device of claim 6 wherein said triggering means comprises an aerodynamic decelerator opening mechanism.

13. The device of claim 6 wherein said triggering means comprises a parachute opening mechanism.

14. The device of claim 6 wherein said triggering means comprises a controllable electron valve.

15. The device of claim 1 wherein said protection means comprises two switches.

16. The device of claim 1 wherein said containment means comprises a housing unit, whereby the said housing unit is substantially sized to allow said housing unit to be secured to a harness.

17. The device of claim 1 wherein said aerodynamic decelerators comprises parachutes.

18. The device of claim 1 wherein said airborne signals comprises radio frequency signals.

* * * * *